Feb. 13, 1945. H. H. FREEMAN 2,369,555
TOOL ADJUSTING MEANS
Filed Oct. 12, 1942

Inventor
Harry H. Freeman
by [signature]
Atty.

Patented Feb. 13, 1945

2,369,555

UNITED STATES PATENT OFFICE 2,369,555

TOOL-ADJUSTING MEANS

Harry Howard Freeman, Teddington, England

Application October 12, 1942, Serial No. 461,730
In Great Britain October 8, 1941

2 Claims. (Cl. 29—96)

This invention relates to a device by means of which a lathe cutting tool, such as that of a capstan or turret lathe can be adjusted to fine limits.

The invention can be applied to various types of turning tools such as roller box turning tools, V-steady turning tools and recessing tools.

The cutter for turning, forming, recessing or otherwise operating upon a workpiece, generally of metal, is usually adjusted in its tool-holder by slackening the set screws, by which it is held in the tool-holder, and one or more taps are applied to the rear end of the cutter in order to advance its cutting point or edge.

When it is necessary to work to fine dimensions the results obtained are not always satisfactory, and the operation is tedious as it is frequently necessary to advance the cutter a number of times before the final cut is obtained, whilst as the advance of the cutter is effected by guesswork the final cut may be too deep thus resulting both in waste of time and material.

It is the object of the present invention to provide a device whereby a cutter may be advanced with a fine and accurate adjustment.

According to the present invention a tool-holder is provided adjacent the tool with a screw threaded hole of predetermined pitch with which engages a head screw of corresponding pitch, the head of the screw being adapted to bear against the rear end of the tool, so that when the screw is screwed into the hole, the tool is advanced a corresponding amount. The head may be suitably shaped, for example square or hexagonal, for engagement by a spanner, or for engagement by any suitable tool or even by hand. The pitch of the screw and the angle of turning of the head determines the amount of advance of the tool.

The screw threads may be micrometer threads whilst the head of the screw may be graduated, the graduations co-operating with a suitable mark on the tool-holder. By means of an arrangement of this character fine adjustments of the tool can be made.

A co-operating projection and groove may be provided in the screw and tool so that as the screw is unscrewed it retracts the tool. For this purpose the tool may be provided with a projection which engages with an annular groove in the screw adjacent its head. The groove may be formed by providing on the screw a collar which is spaced from the head a distance equal to the length of the projection which is located adjacent the rear end of the tool.

If desired a recess may be provided in the tool at a short distance from the rear end thereof, this recess being engaged by a collar on the screw, the collar being spaced from the head of the screw a distance equal to the spacing of the recess from the rear end of the tool.

In order to ensure that the tool is moved in a parallel plane by the head, a plate is secured to the body by spring-loaded fixing screws and is provided with a projection which fits into the slot and bears against the tool in the slot.

The invention will now be described by way of example as applied to a knee tool with reference to the accompanying drawing, wherein.

Figure 1:
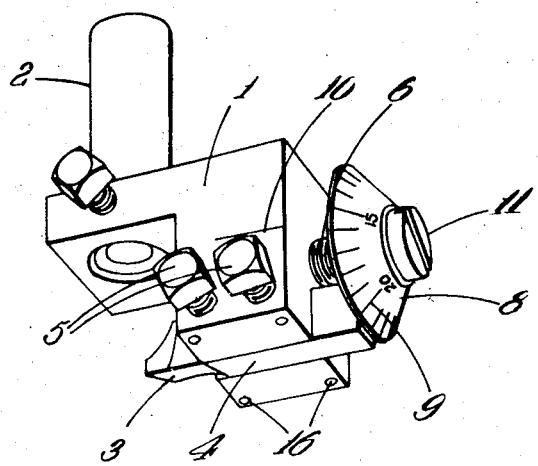
Figure 1 is a perspective view of a knee tool.

In Figure 1 is shown a knee tool provided with a body 1 in which is secured a shank 2 for mounting the tool on a capstan or turret lathe. The body 2 for receiving the tool 3 is provided in the usual manner with a recess 4 in which the cutter 3 is clamped by two set screws 5.

In the body 1 of the tool, adjacent the cutter 3 is drilled a hole 6 which is provided with a micrometer pitch thread. Into the hole 6 is screwed a screw 7 of corresponding pitch which is provided with a head 8 adapted to bear against the rear end of the cutter 3.

The head 8 as shown is of truncated shape, the base bearing against the end of the cutter 3, whilst the conical surface is graduated, as indicated at 9. The graduations are adapted to co-operate with a suitable mark 10 on the body 1 of the tool.

For advancing the cutter 3, the set screws 5 are slackened and the micrometer screw 7 is turned through the amount of advance of the cutter 3 required, whereupon the set screws 5 are again tightened. In this manner the cutter 3 can be advanced through any desired amount.

To facilitate turning the micrometer screw 7, it may be provided at its outer end with a diametral groove 11 for engagement by a screw driver, or it may be suitably shaped for engagement by a spanner or other suitable tool.

By way of example the pitch of the screw 7 may be such that a complete revolution thereof produces an advance of the cutter 3 of .025", resulting in a reduction of the diameter of the work by .05", whilst the graduations 9 may be such that when the head 8 of the screw 7 is turned through one division the cutter 3 is advanced by .001" whereby the diameter of the work is reduced by .002".

The invention is applicable for adjusting the advance of various types of tools of capstan and turret lathes.

The screw 7 used need not necessarily be a micrometer pitch screw, but where extreme accuracy is not required, may be a screw of any standard pitch and provided with a square or hexagonal head or with a diametral recess, the angular turning movement and pitch serving to determine the amount of advance.

Figure 2:
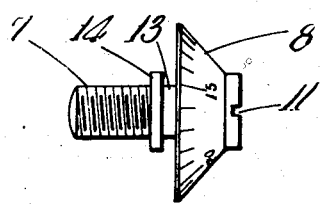
Figure 2 shows a side view of a modified form of adjusting screw.

When it is also desired to make provision for retracting the cutter 3 when the screw 7 is unscrewed, the cutter 3 is provided adjacent its rear end with a projection 12 (Figure 3), such as a hardened pin, which engages with an annular groove 13 (Figure 2) provided in the screw 7 adjacent the inner face of the head 8 of the screw 7.

Figure 3:
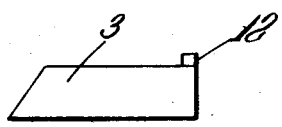
Figure 3 shows a side view of a tool for use in connection with the adjusting screw shown in Figure 2.

As shown in Figure 3 the annular groove 13 is formed by providing the screw 7 with an annular collar 14, which is spaced a sufficient distance from the inner face of the screw head 8 so as to accommodate the projection 12.

In an alternative arrangement the cutter 3 may be provided in the face thereof, adapted to lie adjacent the screw 7, with a recess, this recess being located at the same distance from the end of the cutter 3 as the collar 14 from the screw head 8 so that it can be engaged by the collar 14.

As will readily be appreciated, it is possible with these arrangements to advance or retract the cutter 3 when the screw 7 is rotated in one direction or the other.

Figure 4:
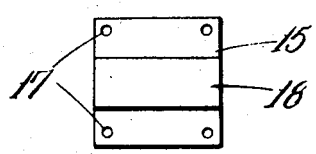
Figures 4 and 5 show a face view and an end view of a guide plate.
Figure 5:
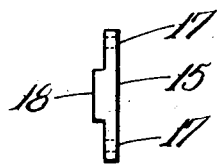

For ensuring that the cutter 3 is always moved in a parallel plane, and to prevent any tendency of the cutter 3 moving from the desired plane and consequently being adjusted at an angle, a plate 15 (Figures 4 and 5) is secured to the toolholder 1 over the slot 4 in which the cutter 3 is mounted, by means of four spring-loaded fixing screws, which engage with tapped holes 16 in the body 1. The plate 15 is provided with four clearance holes 17 so positioned that two of the screws engage with the tool-holder 1 on each side of the slot 4. The plate 15 is provided with a projection 18 extending the full length of the plate 15 and machined to fit the slot 4 and bear against the cutter 3. By tightening or slackening the screws, by which the plate 15 is secured to the tool-holder 1, the cutter 3 can be clamped in the adjusted position or released for the purpose of being advanced or retracted when the adjusting screw 7 is turned.

By the provision of the plate 15 with its projection 18, it is also possible to clamp the cutter 3 in the tool-holder 1 in such a manner that the cutter 3 can be moved in its slot 4 with a varying degree of freedom.

The plate 15 also ensures that the cutter 3 can be controlled in a foolproof manner over the entire range of adjustment.

In an alternative arrangement, the cutter slot 4 may be replaced by a drifted or broached hole to receive the cutter 3. This ararngement, however, does not make provision for compensating for wear or slight variations in the cross sections of various cutters.

What I claim is:

1. A tool holder, comprising a body, a shank secured to said body, said body being formed in one face thereof with a recess of rectangular cross section extending the full length of said body, a tool of rectangular cross section movable longitudinally in said recess and having its opposite ends projecting from the ends of said recess, said recess being of sufficient width to enable said tool to be inserted laterally into said recess, set screws engaging said body for clamping the tool in said recess, said body having a threaded bore therein extending parallel with said recess, a threaded rod engaging said threaded recess, a head carried by and rigid with said rod, said head having a flat face to overlie and bear against one end of the tool and having a diameter to cause the head to substantially cover the end of the tool in any rotative position of the head, whereby rotation of the head and thereby of the rod will move the tool longitudinally in the recess in the body.

2. A tool holder, comprising a body, a shank secured to said body, said body being formed in one face thereof with a recess of rectangular cross section extending the full length of said body, a tool of rectangular cross section movable longitudinally in said recess and having its opposite ends projecting from the ends of said recess, said recess being of sufficient width to enable said tool to be inserted laterally into said recess, set screws engaging said body for clamping the tool in said recess, said body having a threaded bore therein extending parallel with said recess, a threaded rod engaging said threaded recess, a head carried by and rigid with said rod, said head having a flat face to overlie and bear against one end of the tool and having a diameter to cause the head to substantially cover the end of the tool in any rotative position of the head, whereby rotation of the head and thereby of the rod will move the tool longitudinally in the recess in the body, a plate secured to said body, said plate extending the full length of said body and bridging said recess, and a projection on said plate extending the full length of said plate, said projection being of a width corresponding with said recess, said projection cooperating with said recess and bearing against one face of said tool.

HARRY HOWARD FREEMAN.